Feb. 21, 1933.  C. M. STOVER ET AL  1,898,150
OUTBOARD MOTOR STEERING DEVICE
Filed July 30, 1932   2 Sheets-Sheet 1

INVENTOR.
Carl M. Stover
Jack M. Wright
Harry Schroeder
BY
ATTORNEYS.

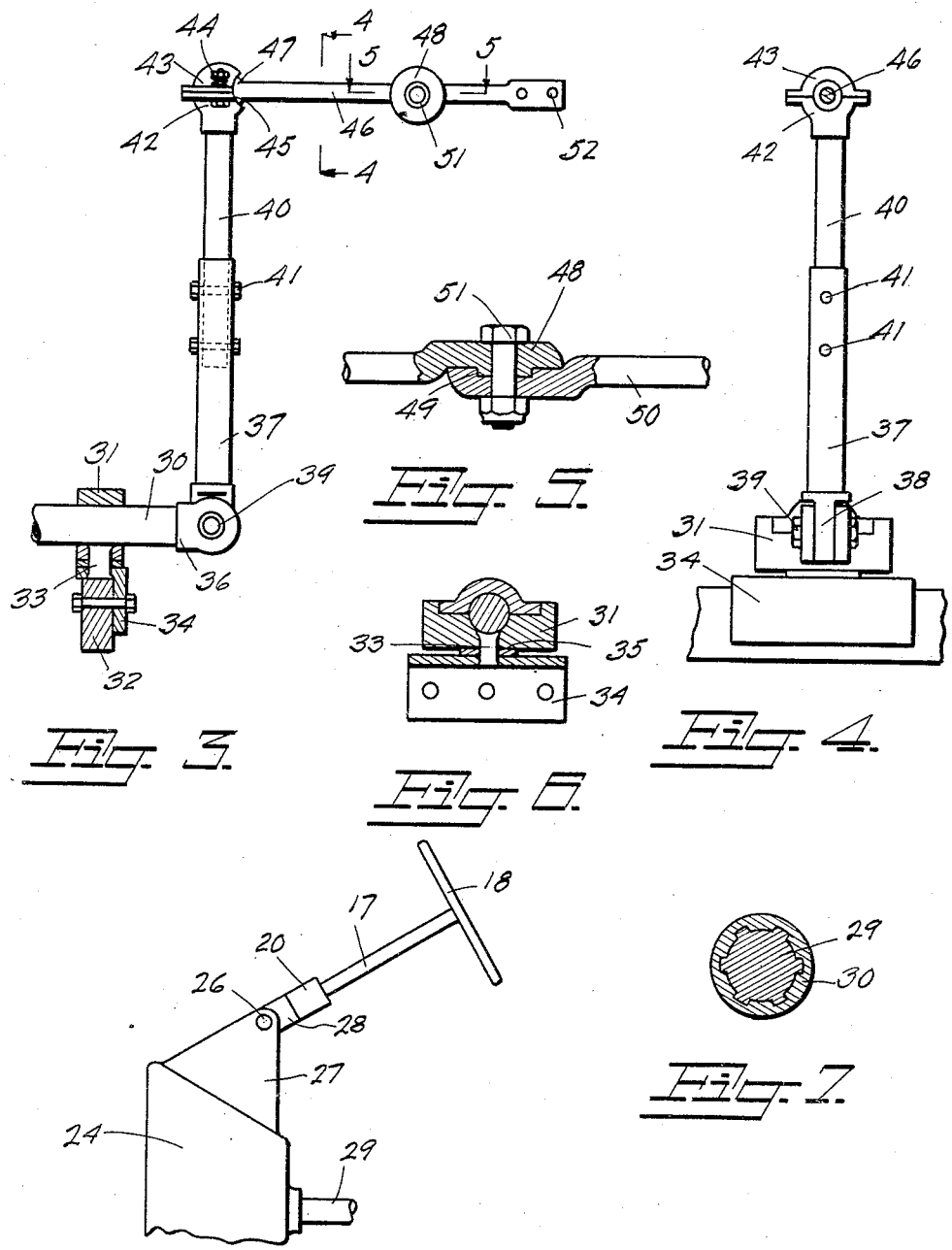

Patented Feb. 21, 1933

1,898,150

UNITED STATES PATENT OFFICE

CARL M. STOVER AND JACK W. WRIGHT, OF OAKLAND, CALIFORNIA

OUTBOARD MOTOR STEERING DEVICE

Application filed July 30, 1932. Serial No. 626,692.

This invention is a steering device for outboard motors and has special reference to a remote control means for steering an outboard motor boat.

The outboard motor boat is steered by angular adjustment of the motor and propeller, a hand lever being provided for this purpose, requiring that the operator be positioned adjacent the motor while steering the craft.

Remote control means for steering motor boats has been provided in the form of a steering wheel having a sheave with which a cable cooperates, the cable being connected either to the usual steering lever or to a sheave mounted in lieu thereof. This remote control means provides a very laggard operation, so that a quick response is not obtainable by this means of steering.

The present invention provides a quickly responsive remote control means for outboard motors, and one which is adaptable, without change, for use in motor boats of various lengths, as also for various heights from the bottom of the boat to the steering lever on the motor.

The main object of the invention, therefore, is to provide quickly responsive remote control steering means for outboard motors.

Another object of the invention is to provide a steering device as outlined which may be adjusted to suit various conditions, such as the length of the boat or distance from motor to steering position, also to suit the vertical distance from the bottom of the boat to the position of the usual steering lever, and in addition to the above, to permit the positioning of the steering wheel in any transverse position in the boat, and also to allow angular adjustment of the steering column.

A further object of the invention is to provide suitable flexibility in the device described, so that there will be no binding action in any position during operation of the steering means.

Other objects and advantages of the invention will become apparent as the following description is read on the drawings forming a part of this specification and in which similar reference characters are used to designate similar parts throughout the several views, of which:

Fig. 3 is a side view of the steering arms.

Fig. 4 is a section taken on line 4—4 of Fig. 3.

Fig. 5 is a section taken on line 5—5 of Fig. 3.

Fig. 6 is a transverse section through the main shaft bearings, showing the pivotal mounting.

Fig. 7 is a section taken through the telescopic main shaft.

Fig. 8 is a side view of the steering column and the pivotal mounting therefor.

Figure 1:
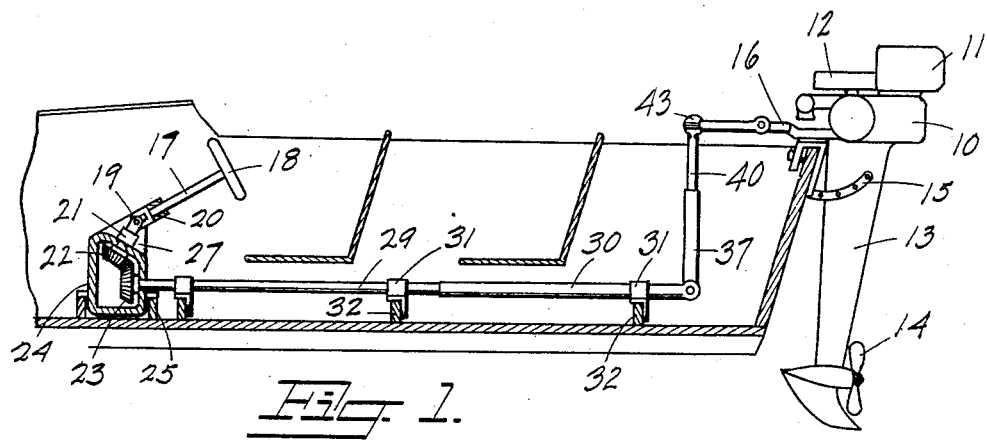
Fig. 1 is a longitudinal section through an outboard motor boat showing my invention applied thereto.
Figure 2:
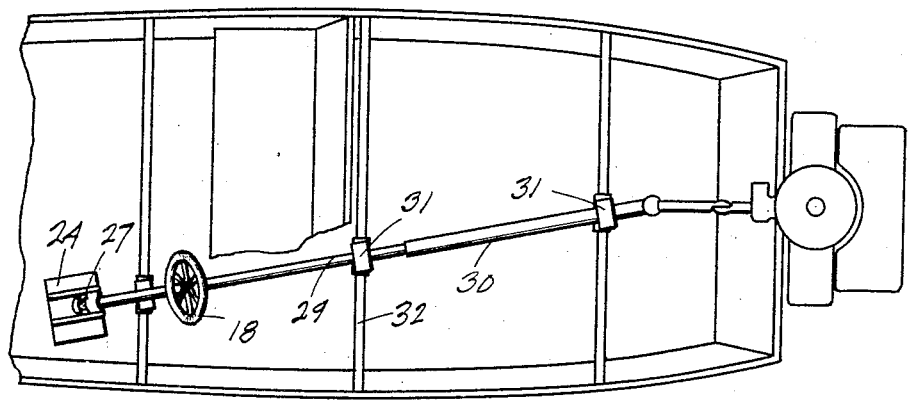
Fig. 2 is a plan view of Fig. 1.

The usual outboard motor consists of the usual radial gasoline motor 10 having a gasoline supply tank 11 and flywheel 12, the shaft from the flywheel and motor extending downwardly through a housing 13, and operating through bevel gears to drive a propeller 14, angular adjustment of the motor being provided by an arm 15. The outboard motor as standard equipment, is provided with a hand lever 16 which connects with means whereby the angular relation of the propeller, as related to the longitudinal axis of the motor may be varied, by which means the boat is steered. The parts and equipment so far enumerated are not a part of my invention, but are used in conjunction with my invention, in which the hand lever 16 is replaced by a special form of lever as is shown in Fig. 3 and which will be explained as this description progresses.

My invention consists of a steering column 17 terminating in a steering wheel 18, this steering column 17 having a universal joint 19, and supporting bearings 20 and 21 on opposite sides of the universal joint, the lower end of the steering column below the universal joint having affixed thereto, a bevel gear 22 which meshes with a mating bevel gear 23, the bevel gears being enclosed in a housing 24, which is mounted on sleepers 25 secured to the bottom of the boat. The bearing 21 is integral with the top of the housing 24 and the bearing 20 is pivotally mounted at 26 substantially the operating center of the universal joint, in brackets 27, which brackets are integral with the top of the housing forming a yoke. The bearing 20 terminates in a yoke 28, each leg of which is pivoted at 26 to the respective brackets 27. By this means the hand wheel and steering column may be adjusted in any desired angular position and will operate through the universal joint to the bevel gears 22 and 23. Suitable clamping means may be provided if desired for clamping the yoke 28 against pivotal movement about the pivots 26.

The main shaft consists of two members, 29 and 30 which are non-rotative one relative to the other, the shaft 29 being slidable within the shaft 30, forming thereby a telescopic shaft which may be extended to suit various boat lengths. This shaft is mounted in bearings 31 which are secured to the ribs 32, these bearings consisting of a main bearing portion and a cap, the main bearing portion being pivotally secured, as indicated at 33, to a mounting member 34, which may preferably consist of an angle, a washer 35 being interposed between the bottom of the bearing and the top of the mounting member. This provides a bearing which will permit the shaft 29—30 to be disposed at any angle relative to the longitudinal axis of the boat.

The shaft 29—30 terminates in a yoke 36, providing a mounting for a steering arm 37, which terminates in an eye member 38, which is pivoted between the respective legs of the yoke 36, as is indicated at 39. This steering arm 37 is also made telescopic, consisting of the female member 37 and the male member 40, one slidable relative to the other, and being secured against rotation and retained in adjustment by means of bolts 41. The male member 40 terminates in a ball joint, consisting of a spherical housing 42 having a cap 43, the two being preferably bolted together and resiliently retained by the springs 44, an opening 45 being provided of sufficient area to permit free movement of an arm 46.

The arm 46 terminates in a spherical or ball end 47 at one end, the other end being of disc-like character 48 having a projecting shoulder 49 to act as a pivot point. The mating member of the steering lever consists of a lever 50, which replaces the usual steering lever 16, and which is provided with a counterbore to cooperate with the shoulder 49, the two being pivoted together by a bolt 51 to permit pivotal movement in a vertical plane, bolt holes being provided in the other end of the member 50 as indicated at 52 to permit bolting of this lever in place of the usual hand lever provided.

The shaft 29—30 may be formed as is indicated in Fig. 7, being of the usual splined form or may consist of any non-circular mating sections, whereby the two shafts may be telescoped one relative to the other. The same forms may also be supplied for the steering arm 37—40.

It will be noted that the specific structure of the system of levers and connections 36, 37, 40, 42, 47, and 48 allow complete flexibility through this series of parts, so that when the shaft 29—30 is rotated in either direction, lever 46 is permitted to pivot in a vertical plane about the pivot 51 while arm 37—40 is permitted to pivot in a longitudinal plane relative to the shaft 29—30, and universal motion is provided at the joint 42—47, this being a ball joint.

As the shaft 30 is rotated in either direction from the vertical position of the lever 37, this arm 37 will swing about the pivot 39, arm 46 will swing about the pivot 51 and the ball joint 42—47 will permit all variations and retain all parts in their proper sequence.

The steering column 17 and steering wheel 18, due to its pivotal support and bearing 20 and the universal joint 19, may be adjusted to any desired operative position, and by merely turning the steering wheel 18, motion is transmitted directly to the steering arm 50, requiring only a comparatively small movement of the steering wheel 18, which movement is positively transmitted to the outboard motor. There is no lag in the movement and no irregularity, two features which are of vital importance and are conducive to both safety and speed in turning.

Having described an operative device it will be understood that variations in construction and arrangement of parts which are consistent with the appended claims may be resorted to without detracting from the spirit or scope of the invention or sacrificing any of the advantages thereof.

We claim:

1. In combination with a boat having an outboard motor: Remotely controlled steering means having a telescopically adjustable shaft to compensate for variations in distance of control position from the motor, a control for said steering means, and pivotally mounted shaft bearings for permitting angular displacement of the control relative to the longitudinal axis of the boat.

2. Steering means for a boat having an outboard motor comprising a shaft rotatably mounted, a steering wheel cooperating with one end of said shaft, a lever arm hingedly secured to the other end of said shaft, said lever arm terminating in a ball socket, a connecting lever having a ball at one end disposed in said ball socket, the other end of said connecting lever being hingedly connected to the steering arm of said outboard motor, said ball and socket joints and hinged connections permitting swinging movement of the outboard motor on its pivotal mounting.

3. In combination with a boat having an outboard motor: Remotely controlled steering means having a telescopically adjustable shaft to compensate for variations in distance of control position from the motor, a control for the steering means, pivotally mounted shaft bearings for permitting angular displacement of the control relative to the longitudinal axis of the boat, said steering means permitting swinging movement of the motor on its pivotal support.

In testimony whereof we affix our signatures.

CARL M. STOVER.
JACK W. WRIGHT.